United States Patent [19]
Jeddeloh et al.

[11] Patent Number: 5,991,855
[45] Date of Patent: Nov. 23, 1999

[54] LOW LATENCY MEMORY READ WITH CONCURRENT PIPE LINED SNOOPS

[75] Inventors: Joseph Jeddeloh, Minneapolis; James Meyer, Shoreview; Jeffrey R. Brown, Plymouth, all of Minn.

[73] Assignee: Micron Electronics, Inc., Nampa, Id.

[21] Appl. No.: 08/887,039

[22] Filed: Jul. 2, 1997

[51] Int. Cl.[6] .................................................. G06F 12/00
[52] U.S. Cl. ........................ 711/146; 711/154; 711/168; 711/150; 711/169
[58] Field of Search .................................... 711/146, 150, 711/168, 118, 117, 143, 169, 154, 112

[56] References Cited

U.S. PATENT DOCUMENTS

| | | | |
|---|---|---|---|
| 5,073,851 | 12/1991 | Masterson et al. | 395/425 |
| 5,249,282 | 9/1993 | Segers | 395/425 |
| 5,355,467 | 10/1994 | MacWilliams et al. | 711/146 |
| 5,553,265 | 9/1996 | Abato et al. | 711/146 |
| 5,623,628 | 4/1997 | Brayton et al. | 711/146 |
| 5,627,990 | 5/1997 | Abato et al. | 711/143 |
| 5,634,068 | 5/1997 | Nishtala et al. | 711/141 |
| 5,664,150 | 9/1997 | Issac et al. | 711/143 |
| 5,696,935 | 12/1997 | Grochowski et al. | 711/146 |
| 5,802,575 | 9/1998 | Greenley et al. | 711/144 |
| 5,819,105 | 10/1998 | Moriarty et al. | 711/146 |
| 5,909,694 | 6/1999 | Gregor et al. | 711/128 |

OTHER PUBLICATIONS

Shanley and Anderson, "ISA System Architecture," *Addison–Wesley Publishing Co.*, 3rd Ed., pp. 235–272, Feb. 1995.

*Primary Examiner*—John W. Cabeca
*Assistant Examiner*—Pierre-Michel Bataille
*Attorney, Agent, or Firm*—Seed and Berry LLP

[57] ABSTRACT

A method processes memory transactions in a computer system having a system memory and a cache memory. The method transmits a memory request to the system memory without waiting for the cache memory to be snooped to determine whether the cache memory stores information in an address corresponding to a selected address of the system memory. The method may transmit a snoop request to the cache memory concurrently with or after the memory request is transmitted to the system memory. The method may be implemented using a system controller having a control switch that uses a first pathway for the memory request and a second pathway for the snoop request so that the snoop and memory requests can be transmitted simultaneously.

38 Claims, 8 Drawing Sheets

LOW LATENCY MEMORY READ WITH CONCURRENT PIPE LINED SNOOPS

CROSS REFERENCE TO RELATED, COPENDING APPLICATION

The present application is related to the following U.S. patent application: "APPARATUS FOR PERFORMING A LOW LATENCY MEMORY READ WITH CONCURRENT SNOOP", invented by Joseph Jeddeloh, James Meyers, and Jeffrey R. Brown, application Ser. No. 08/886,908 filed concurrently herewith.

TECHNICAL FIELD

The present invention relates to processing transactions in a computer system, and more particularly, to a method for snooping a cache memory concurrently with accesses of system memory.

BACKGROUND OF THE INVENTION

Shown in FIG. 1 is a prior art computer system 10 that includes a processor bus 12 coupled to a cache memory 14 and to a computer processor 16. The computer system 10 also includes a system memory 17 coupled to the processor bus 12 by a memory controller 18. Also coupled to the processor bus 12 by a PCI-host bridge 20 is a Peripheral Component Interconnect (PCI) bus 22. Coupled to the PCI bus 22 by a graphics controller 24 is a graphics monitor 26 that outputs information to a user. An Industry Standard Architecture (ISA) bus 28 also is coupled to the PCI bus 22 via a PCI-ISA bridge 30. Coupled to the ISA bus 28 are a hard drive 32 and an input device 34, such as a keyboard, mouse, or microphone, that inputs information to the computer system 10 from the user.

As computer devices have become more sophisticated and faster, it has become more difficult for the computer buses, such as the processor bus 12, to keep up with the increased rate of data flow presented by the computer devices. Whenever the processor 16 or the devices 22–36 coupled to the processor via the PCI-host bridge 20 requests access to the system memory 16, the request and accompanying data and control signals must be transmitted across the processor bus 12. As such, the performance of the entire computer system 10 can be limited by the speed of the processor bus 12, the PCI bus 22, and/or the ISA bus 28. Moreover, as the speed of computer devices continues to increase, the delays caused by sharing the resources of the processor bus 12 become more acute.

One reason for delay in computer buses, such as the processor bus 12, is that each computer bus includes one or more data lines that handle data being transmitted in both directions. For example, the processor bus 12 handles data being read from and written to the system memory 16. As a result, each time access to the system memory 16 switches from a read to a write or a write to a read, data must go completely through the processor bus 12 before data can be sent through the processor bus in the opposite direction. The time it takes to wait for the processor bus 12 to switch from one direction to the opposite direction is known as bus turn-around time and typically is at least one clock cycle of delay.

In addition to the increased speed of current computer devices, the computer buses must be able to handle the increase in the number of computer devices in current computer systems. For example, many current computer systems are provided with CD-ROM drives, local area network (LAN) connections, modems, plural microprocessors, etc. in addition to the standard computer devices shown in FIG. 1. Each computer device added to a computer system is another device that must share the same limited resources of each computer bus.

In a typical computer system, such as computer system 10, most transactions between devices are directed to the system memory 17. An additional source of delay for such memory transactions is caused by having to snoop the cache memory 14 before completing the memory transaction. Snooping refers to determining whether the cache memory 14 currently stores information in an address corresponding to a selected address of the system memory 17 being accessed (read from or written to) by the memory transaction. The processor bus 12 must be acquired before a snoop can take place and for a pipelined bus, that may take many clock cycles to occur. Only after the cache memory 14 returns an indication of whether the cache memory 14 stores information in an address corresponding to the selected address of the memory transaction can the memory transaction be completed by accessing the system memory 17.

SUMMARY OF THE INVENTION

An embodiment of the present invention is directed to a method for processing memory transactions in a computer system having a system memory and a cache memory. A snoop request is transmitted to the cache memory to request from the cache memory an indication of whether the cache memory currently stores information at an address corresponding to a selected address of the system memory. Also transmitted to the system memory is a memory request for access to the selected address of the system memory. The memory request is transmitted before the cache memory produces the indication of whether the cache memory currently stores information at an address corresponding to the selected address of the system memory.

The method may be implemented using a system controller coupled to the system memory, the cache memory, and a memory requester that initiates the memory transaction. The system controller may include a control switch that selectively connects a requester interface to a processor interface and a memory interface. In response to receiving a transaction request from a memory requester, the requester interface concurrently transmits the snoop request to the processor interface and the memory request to the memory interface. The control switch may include a first pathway connecting the requester interface to the memory interface and a second pathway connecting the requester interface to the processor interface to allow the concurrent transmission of the memory and snoop requests on the first and second pathways, respectively.

DETAILED DESCRIPTION OF THE INVENTION

An embodiment of the present invention is directed to a method and apparatus for processing memory transactions in a computer system having a system memory and a cache memory. A memory request is transmitted to the system memory without waiting for the cache memory to be snooped to determine whether the cache memory stores information in an address corresponding to a selected address of the system memory. A snoop request may be transmitted to the cache memory concurrently with or after the memory request is transmitted to the system memory. By transmitting the memory request without waiting for the snoop request to be executed, the cache snoop delays of prior art transaction processing techniques are eliminated.

The following discussion of FIGS. 2–7 explains a computer system that employs a control switch to process generic computer transactions between devices of the computer system. Following that is a discussion, using FIGS. 8 and 9, of how the computer system of FIGS. 2–7 can be employed to concurrently perform snoop and memory phases of a memory transaction according to the present invention.

In one embodiment of the present invention, the method of executing a memory transaction using a concurrent snoop is implemented on a computer system in which a switch selectively connects at least three computer buses with each other. Such a switch may include separate lines for read and write data so that no time is wasted waiting for a bus to change the direction in which the data can be transmitted. In addition, the switch may include dedicated connections between the various computer buses so that data can be transmitted simultaneously by one computer bus to two different computer buses or from two different computer buses to one computer bus. Moreover, such dedicated lines would enable transactions to be heavily pipelined such that transmission time on the dedicated lines is negligible.

Figure 1:
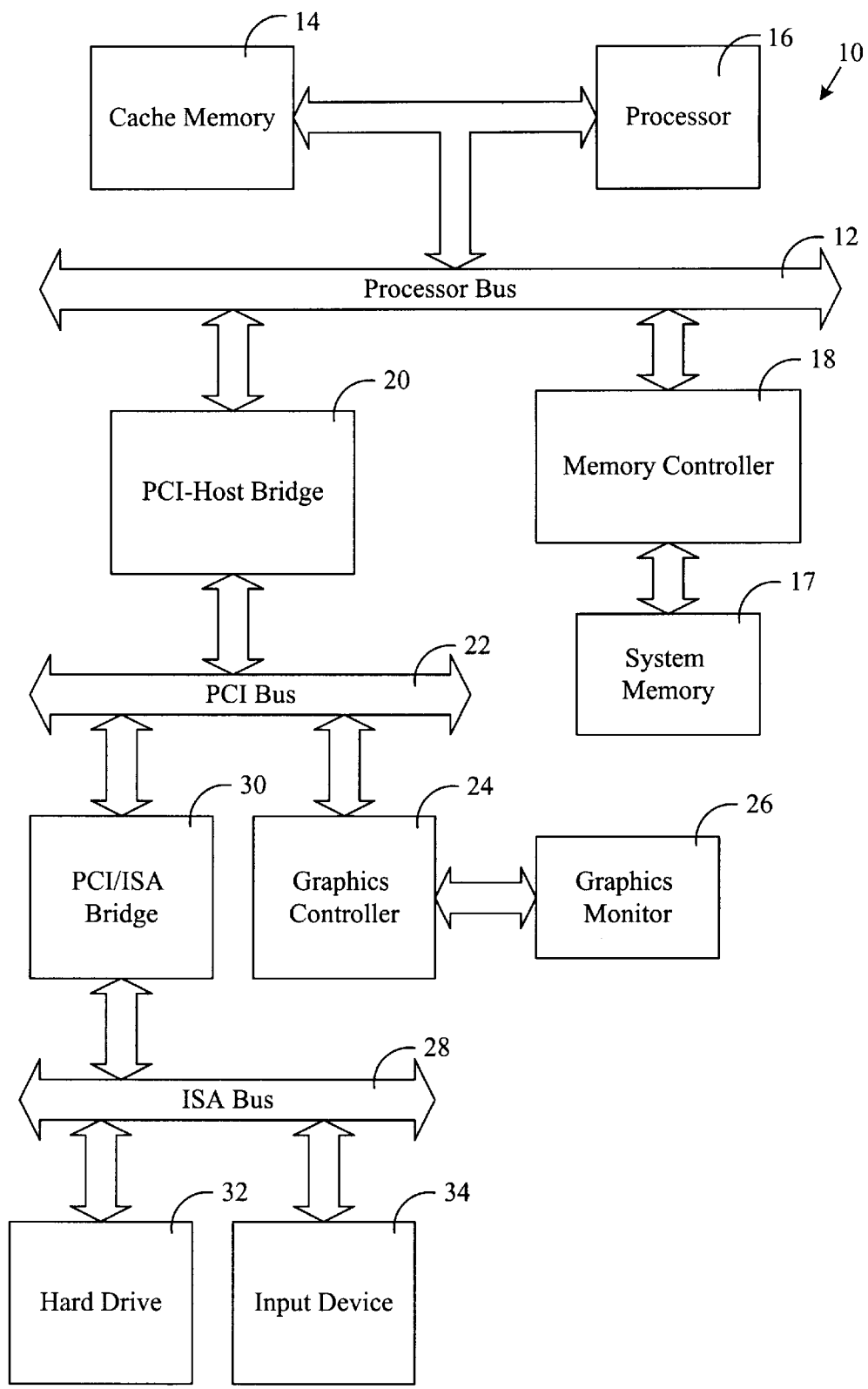
FIG. 1 is a block diagram of a prior art bus-based computer system.
Figure 2:
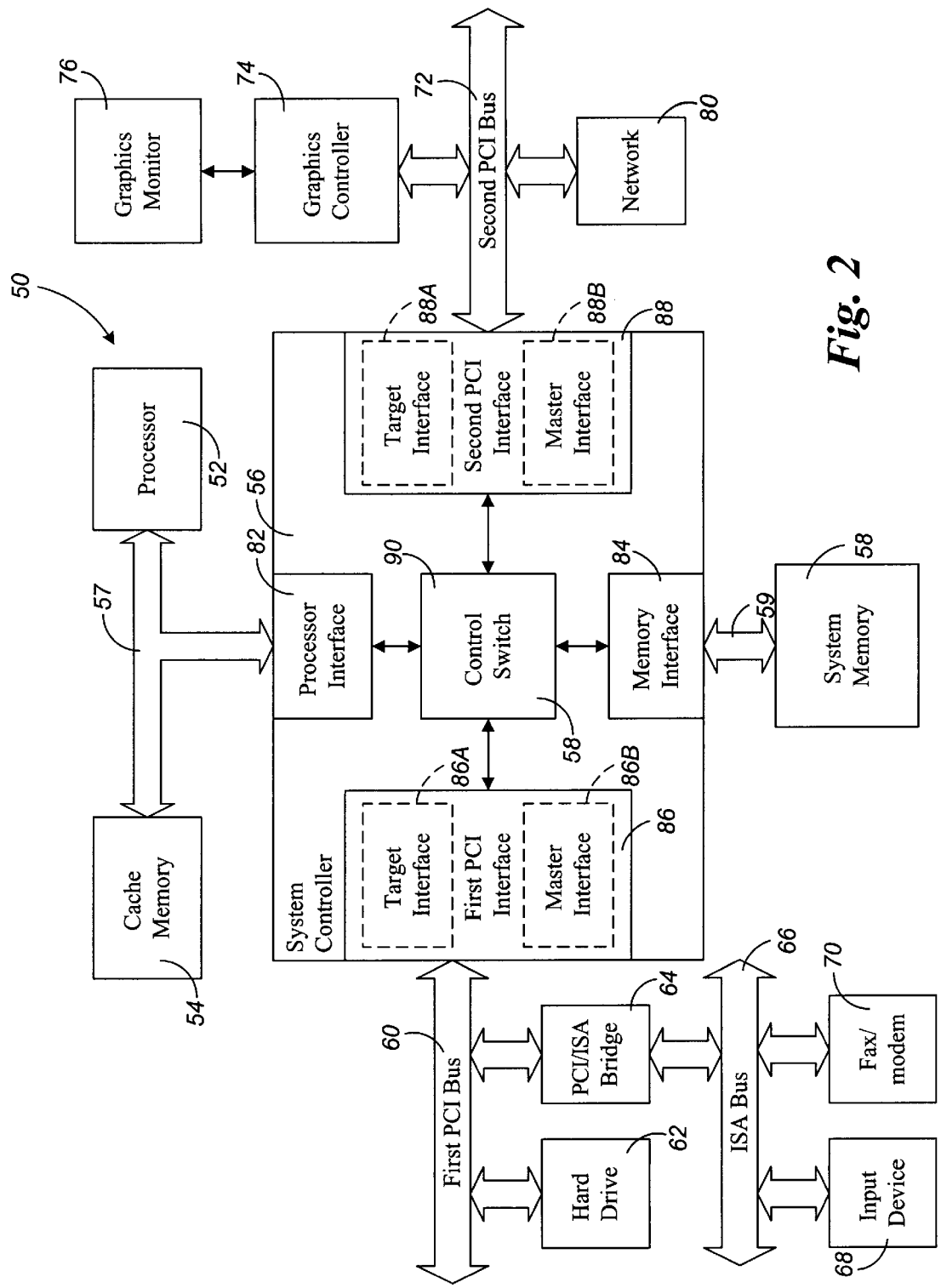
FIG. 2 is a block diagram of a switch-based computer system for employing a method according to the present invention.

A computer system 50 for executing transaction requests according to an embodiment of the present invention is shown in FIG. 2. The computer system 50 includes a processor 52 coupled to a cache memory 54 and to a system controller 56 via a processor bus 57. The processor 52 can include any microprocessor, such as the Pentium Pro™ microprocessor from Intel Corp. The computer system 50 also includes a system memory 58 coupled to the system controller 56 by a memory bus 59. The system memory 58 is generally comprised of dynamic random access memory (DRAM), which stores software instructions and data that is used by the processor 52 to perform a specified function. The software instructions include application programs and an operating system, such as Microsoft Windows NT™, that interfaces the application programs with the hardware of the computer system 10.

The system controller 56 is coupled by a first expansion bus 60, such as a Peripheral Component Interconnect (PCI) bus, to a plurality of PCI computer devices, such as a hard drive 62 and a PCI-ISA bridge 64. The PCI-ISA bridge 64 couples the PCI bus 60 to an Industry Standard Architecture (ISA) bus 66. Coupled to the ISA bus 66 are a plurality of ISA computer devices, such as an input device 68 and a fax/modem 70. The input device 68 can include any of numerous known input devices, such as a keyboard, mouse, and electronic pen and tablet.

The system controller 56 is coupled by a second expansion bus, such as a second PCI bus 72 to a graphics controller 74. The graphics controller 74 controls how graphics images are displayed on a graphics monitor 76 coupled to the graphics controller. Also coupled to the second PCI bus 72 is network 80 which can include a LAN or any other type of network. It will be appreciated that expansion buses other than PCI buses and ISA buses and other computer devices coupled to the expansion buses may be used.

The system controller 56 provides an interface between the processor 52, system memory 58, first PCI bus 60, and second PCI bus 72. The system controller 56 includes a processor interface 82 that controls how data is received from or sent to the processor 52 and the cache memory 54. The system controller 56 also includes a memory interface 84 that controls how data is written to and read from the system memory 18. The system controller 56 also includes first and second PCI interfaces 86, 88 that control how data is sent on the first and second PCI buses 60, 7 respectively. The first PCI interface 86 includes a first PCI target interface 86A that processes transactions received from the first PCI bus 60 and a first PCI master interface 86B that processes transactions being transmitted to the first PCI bus 60. Similarly, the second PCI interface 88 includes a second PCI target interface 88A that processes transactions received from the second PCI bus 72 and a second PCI master interface 88B that processes transactions being sent to the second PCI bus 72.

Each completed transaction transmitted via the control switch 90 between the interfaces 82–88 usually will include three phases: a request phase, a data phase, and a snoop phase. In the request phase, one of the interfaces 82–88 transmits a request for access to one of the other interfaces 82–88. In the data phase, data is passed between the interfaces 82–88 according to the transaction being requested in the request phase. In the snoop phase, the processor interface 82 determines whether the contents of the memory locations in the system memory 58 to which the transaction is directed are located in the cache memory 54. If so, then the transaction is executed using the cache memory 54 by writing data to or reading data from the cache memory 54.

The system controller 56 also includes a control switch 90 that couples the processor interface 82, memory interface 84, first PCI interface 86 and second PCI interface 88 to each other. In one embodiment, the control switch 90 includes separate lines and switches for each of the request, data, and snoop phases of each transaction transmitted between the interfaces 82–88. In addition, the embodiment may include connection lines dedicated to connect each of the interfaces 82–88 to each other. Such dedicated connection lines enable each of the interfaces 82–88 to transmit transactions to two or more of the other interfaces simultaneously.

Figure 3:
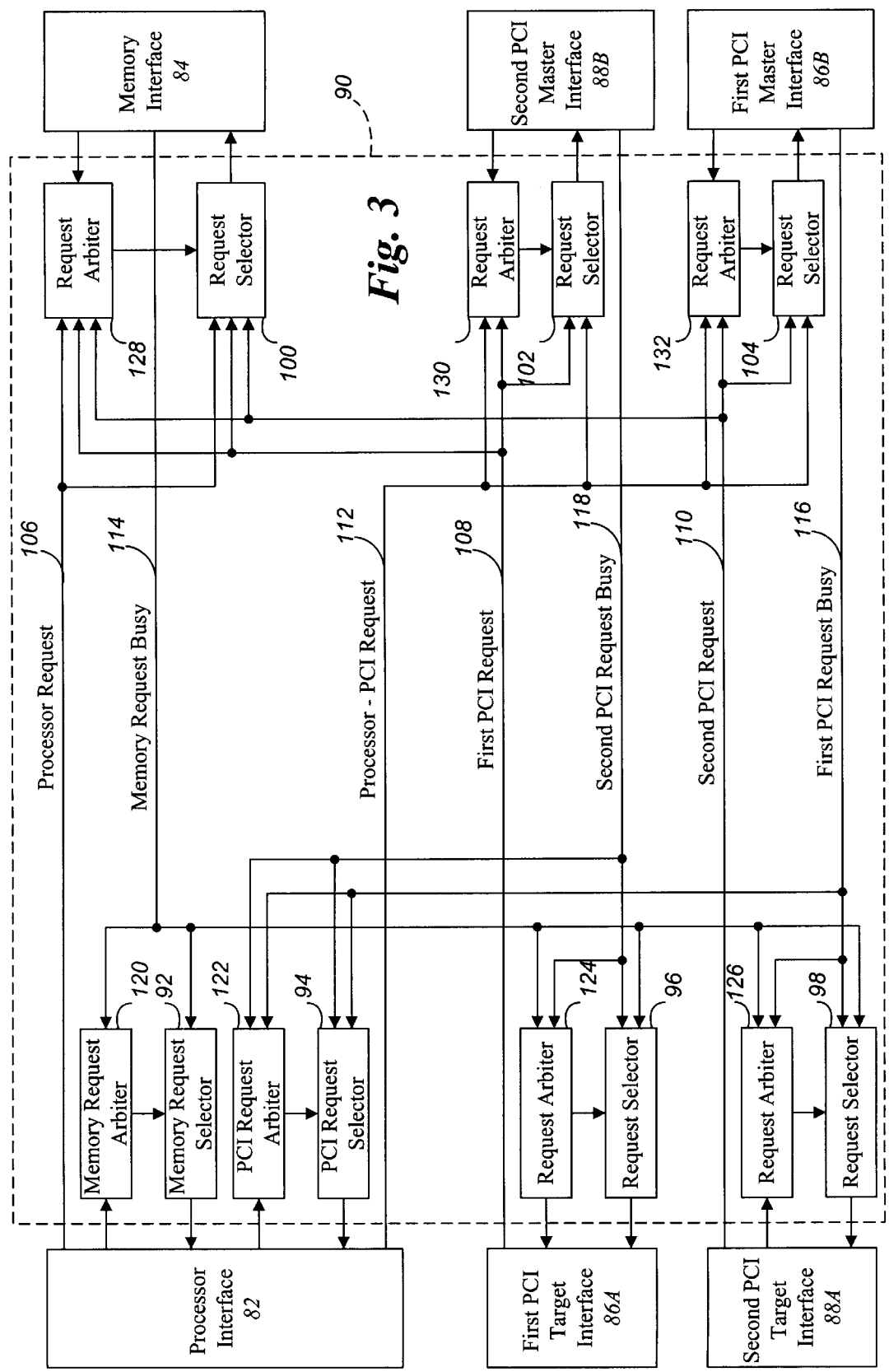
FIG. 3 is a block diagram of a transaction request portion of a bridge of the computer system shown in FIG. 2.

A block diagram of a portion of the system controller 56 that performs the request phase of each transaction is shown in FIG. 3. FIG. 3 shows portions of the control switch 90 that implement the request phase of each transaction. The control switch 90 includes a set of request selectors 92, 94, 96, 98, 100, 102, 104 each dedicated to one of the interfaces 82–88. Each of the request selectors 92–104 is a switch that selectively connects one or more of the interfaces 82–88 to the interface to which the request selector is dedicated. Specifically, the processor interface 82 is associated with a memory request selector 92 that selectively connects the memory controller 84 to the processor interface 82 to enable transaction requests to be transmitted from the memory controller 84 to the processor interface 82. In addition, the processor interface 82 also is coupled to a PCI request selector 94 that selectively connects the first and second PCI master interfaces 86B, 88B to the processor interface 82 to enable transaction requests to be transmitted from the PCI master interfaces 86B, 88B to the processor interface 82. Each of the memory interface 84, first and second PCI target interfaces 86A, 88A, and first and second PCI master interfaces 86B, 88B is associated with a single one of the request selectors 96–104, although plural request selectors for each of the interfaces could be employed as is the case with the processor interface 82. Conversely, the processor interface 82 could be associated with a single request selector coupled to the memory controller 84 and first and second PCI master interfaces 86B, 88B rather than employing separate memory and PCI request selectors 92, 94.

The processor interface 82 and first and second PCI target interfaces 86A, 88A are coupled to the request selector 100 associated with the memory interface 84 by a processor request bus 106, first PCI request bus 108 and second PCI request bus 110, respectively, in order to transmit transaction requests to the memory interface 84. The first PCI request bus 108 is also shown as being coupled to the request selector 102 associated with the second PCI master interface 88B or a separate first PCI request bus could be employed. Similarly, the second PCI request bus 110 can be coupled to the request selector 104 associated with the first PCI master interface 86B or a separate second PCI request bus could be employed. In addition, the processor interface 82 is coupled to the request selectors 102, 104 by a processor-PCI request bus 112 to enable the processor 82 to transmit transaction requests to the first and second PCI master interfaces 86B, 88B. Once again, a second processor-PCI request bus could be employed to connect the processor interface 82 to one of the request selectors 102, 104 rather than coupling the processor-PCI request bus 112 to both request selectors 102, 104.

To enable the memory interface 84 to respond to transaction requests from the processor interface 82 and the first and second PCI target interfaces 86A, 88A, the memos interface 84 is coupled to the memory request selector 92, request selector 96. and request selector 98, respectively, by a memory request busy line 114 Similarly, the first PCI master interface 86B is coupled to the PCI request selector 94 and the request selector 98 by a first PCI request busy line 116 to enable the first PCI master interface to respond to transaction requests from the processor interface 82 and the second PCI target interface 88A. In addition, the second PCI master interface 88B is coupled to the PCI request selector 94 and the request selector 96 by a second PCI request busy line 118 to enable the second PCI master interface 88B to respond to transaction requests from the processor interface 82 and the first PCI target interface 86A. It will be appreciated that the memory request busy line 114 and the first and second PCI request busy lines 116, 118 can include plural lines to enable each of the memory interface 84 and first and second PCI master interfaces 86B, 88B to be separately connected to the memory request switch 92, PCI request switch 94, request switch 96 and request switch 98 as desired.

Associated with each of the request selectors 92–104 is a respective one of a set of request arbiters 120, 122, 124, 126, 128, 130, 132 that control the switching of the respective request selectors 92–104. Each of the request arbiters 120–132 is coupled to the same buses,lines 106–118 as its associated request selector 92–104. Thus, each of the request arbiters 120–132 receives the same transaction requests or request responses as its associated request selector 92–104. The memory request arbiter 120 uses an enable signal to cause the memory request selector 92 to connect the memory interface 84 to the processor interface 82. Each of the request arbiters 122–132 employs a conventional arbitration scheme to determine which of plural interfaces the request selector associated with the request arbiter should connect to the interface associated with the request arbiter.

For example, if the processor 52, fax modem 70, and graphics controller 72 each submit transaction requests for access to the system memory 58, then the processor interface 82 and the first and second PCI target interfaces 86A, 88A will receive and forward the respective transaction requests to the request selector 100 and request arbiter 128 associated with the memory interface 84. Based on its internal arbitration scheme, the request arbiter 128 will select one of the transaction requests and transmit to the request selector 100 a signal indicating which of the transaction requests was selected. The signal from the request arbiter 128 causes the request selector 100 to connect to the memory interface 84 the bus from the interface that transmitted the selected transaction request. For example, if the request arbiter 128 selected the transaction request from the processor interface 82, then the request switch 100 will connect the processor request bus 106 to the memory interface 84 to allow the memory interface 84 to receive the selected transaction request. If the memory interface 84 is not ready to receive the transaction request, then the memory interface 84 will transmit a memory request busy signal on the memory request busy line 114. The memory request busy signal will indicate to whichever one of the interfaces 82, 86A, 88A that transmitted the selected transaction request that the transaction request was not accepted and should be retransmitted to the request selector 100 and request arbiter 128. In addition, the memory interface 84 transmits to the request arbiter 128 a busy signal indicating that the request arbiter 128 should not select additional transaction requests until the busy signal is removed.

If the memory interface 84 is ready to accept the selected transaction request, then the memory interface 84 captures the relevant information from the transaction request. Also, the memory interface 84 transmits a memory request not-busy signal on the line 114 to the interface that transmitted the selected transaction request. The memory request not-busy signal allows the interface that transmitted the selected transaction request to transmit a new transaction request to the request selector 100 and request arbiter 128 if a new transaction request is available. After capturing the selected transaction request, the memory interface can execute the transaction requested by reading data from or writing data to the system memory 58 depending on the type of transaction requested. A similar process occurs with transaction requests transmitted to the first and second PCI master interfaces 86B, 88B.

Figure 4:
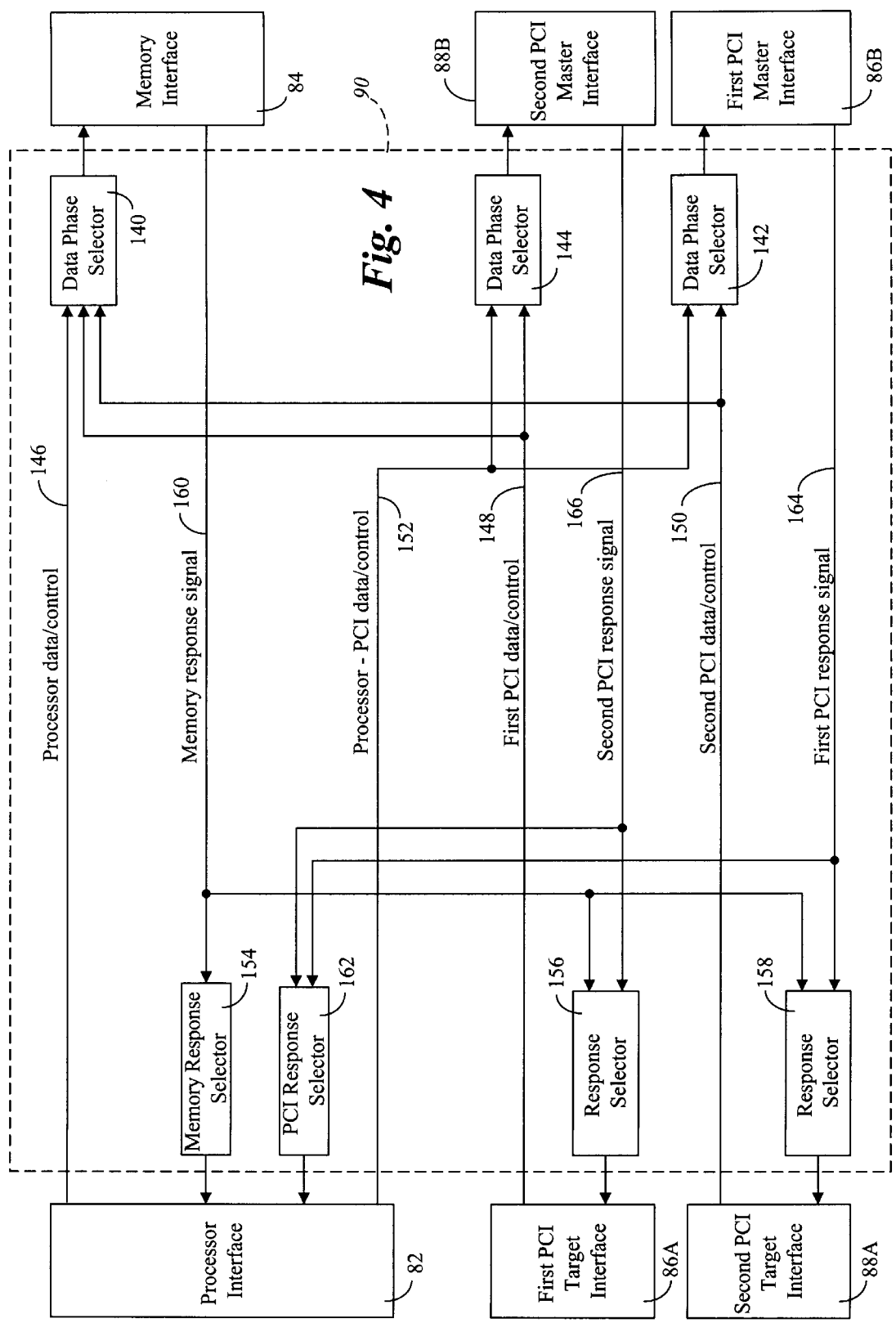
FIG. 4 is a block diagram of a data portion of the bridge of the computer system shown in FIG. 2.

A block diagram of a portion of the system controller 56 that performs the data phase of each transaction is shown in FIG. 4. As discussed above, the data phase of each transaction involves transmitting data between appropriate interfaces 82–88 according to the corresponding transaction request processed by the request phase portion of the system controller 56 shown in FIG. 3. The control switch 90 includes data phase selectors 140, 142, 144 associated with the memory interface 84, first PCI master interface 86B, and second PCI master interface 88B, respectively. Each of the data phase selectors 140–144 is a switch that selectively connects two or more of the processor interface 82 and PCI target interfaces 86A, 88A to the one of the memory interface 84 and PCI master interfaces 86B, 88B that is associated with the data phase selector. Each of the data phase selectors 140–144 is controlled by the signals presented to the data phase selector on a first-come-first-served basis. That is, each of the data phase selectors 140–144 connects to the interface associated with the data phase selector whichever one of the processor interface 82 and PCI target interfaces 86A. 88A first transits a signal to the data phase selector.

The processor interface 82, first PCI target interface 86A, and second PCI target interface 88A are coupled to the data phase selector 140 by processor data/control bus 146, first PCI data/control bus 148, and second PCI data/control bus 150, respectively, to enable data phase data and control signals to be transmitted to the memory interface 84 via the data phase selector 140. The processor interface 82 is coupled to the data phase selectors 142, 144 by a processor-PCI data/control bus 152. The first PCI data/control bus 148 also couples the first PCI target interface 86A to the data phase selector 144 associated with the second PCI master interface 88B. Similarly, the second PCI data/control bus 150 couples the second PCI target interface 88A to the data phase selector 142 associated with the first PCI master interface 86B. It will be appreciated that each of the first and second PCI data,control buses 148–150 can include plural buses coupled to the write selector 140 separately from the data phase selectors 142–144. Similarly, the processor-PCI data/control bus 152 could include two buses to enable the processor interface 82 to be coupled separately to each of the data phase selectors 142, 144.

The control switch 90 enables the data phase of a transaction to be implemented simultaneously wit+h the request phase of the same transaction. To facilitate such phase concurrency, the transaction request and write data of each write transaction can be accompanied by a destination tag that indicates which of the processor interface 82 and first and second PCI target interfaces 86A, 88A transmitted the write transaction. For read transactions, the destination tag can be transmitted with the transaction request portion of the read transactions. Each of the data phase selectors 140–142 can select the write data of write transactions regardless of the order in which the corresponding request selectors 100–104 selected the transaction requests corresponding to the write data. The memory interface 84 and first and second PCI master interfaces 86B, 88B can use the destination tags to ensure that they process the write data in the same order that the corresponding transaction requests were received. Each of the memory interface 84 and first and second PCI master interfaces 86B, 88B may implement a transaction queue that uses the destination tags to associate the write data received in the data phase with the appropriate transaction request received in the request phase.

Associated with the processor interface 82. first PCI target interface 86A, and second PCI target interface 88A are memory response selector 154 and first and second PCI response selectors 156, 158, respectively, coupled to the memory interface 84 by a memory response signal bus 160. Also associated with the processor interface 82 is a PCI response selector 162 that is coupled by a first PCI response signal bus 164 and a second PCI response signal bus 166 to first and second PCI master interfaces 86B, 88B, respectively. Each of the response selectors 154–158, 162 is a switch that selectively connects one or more of the memory interface 84 and PCI master interfaces 86B, 88B to the one of the processor interface 82 and PCI target interfaces 86A, 88A that is associated with the response selector. Each of the response selectors 154–158, 162 is controlled by the signals presented to the response selector on a first-come-first-served basis. The response selectors 156, 158 are coupled to the second and first PCI master interfaces 88B, 86B by the second and first PCI response signal buses 166, 164, respectively. It will be appreciated that each of the response signal buses 160, 164. 166 can include plural buses so that none of the response signal buses are shared by two or more of the response selectors 154–158, 162.

The data/signals that are transmitted on the response signal buses 160, 164, 166 depend on whether the transactions are read or write transactions. If the transaction is a write transaction, then the data/signals include a signal indicating whether the write data was successfully transmitted and a response tag that identifies which of the processor interface 82 and first and second target interfaces 86A, 88A transmitted the write transaction request. If the transaction is a read transaction, then the data/signals sent include the read data and the appropriate response tag. Upon receiving the response tag at one of the response selectors 154–158, 162, the response selector connects the response signal bus from which the response tag was received to the interface associated with the response selector. The response tag enables the processor interface 82 and first and second PCI target interfaces 86A, 88A keep track of which transaction request is being responded to. The processor interface 82 and PCI target interfaces 86A, 88A then can forward the read data or write complete signal to the computer device that initiated the transaction.

Figure 5:
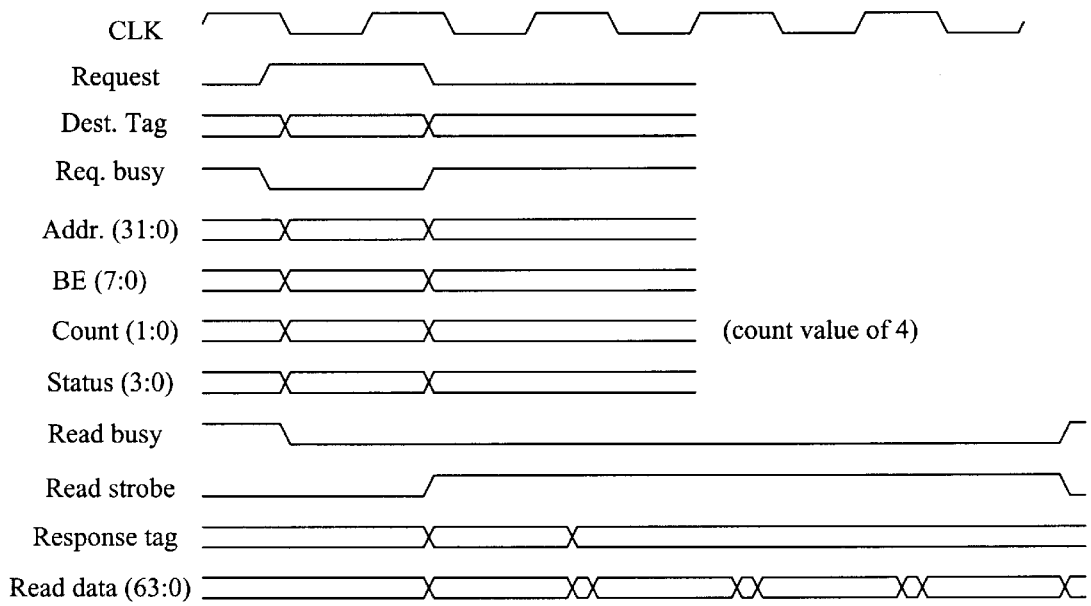
FIG. 5 is a timing diagram of a read transaction implemented by the computer system shown in FIG. 2.
Figure 6:
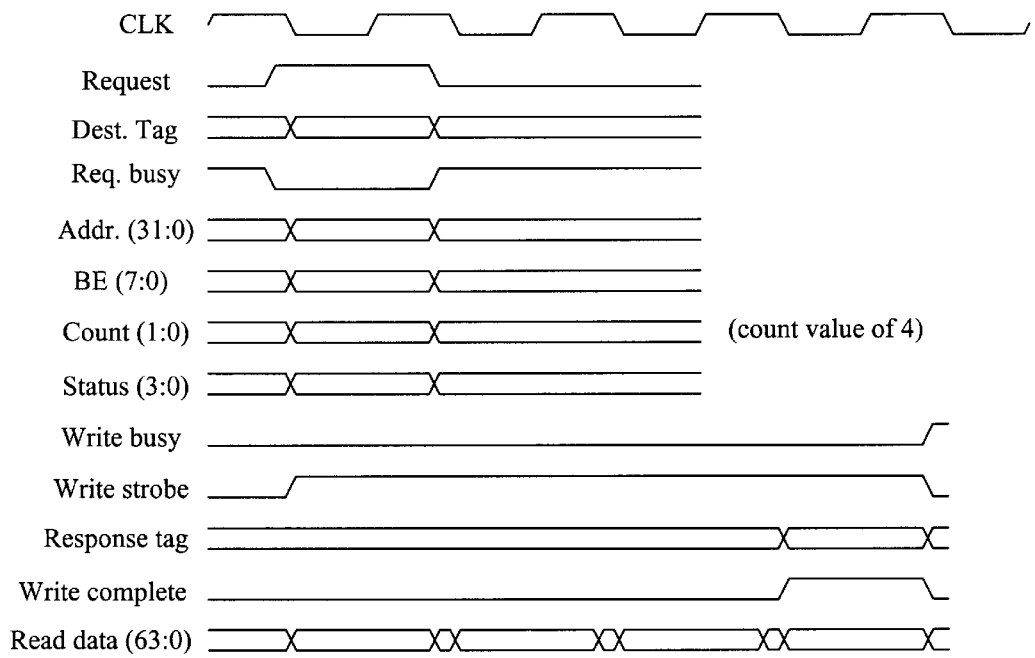
FIG. 6 is a timing diagram of a write transaction implemented by the computer system shown in FIG. 2.

A better understanding of the execution of transactions can be obtained from the timing diagrams of a read transaction in FIG. 5 and a write transaction in FIG. 6. Assume for simplicity that the read and write transactions shown in FIGS. 5 and 6 are requests from the processor 52 to the system memory 58 (FIG. 2). The timing diagrams shown in FIGS. 5 and 6 show the data/signals being transmitted within the system controller 56.

In FIG. 5 the processor interface 82 asserts a transaction request signal on the processor request bus 106 to the request switch 100 and request arbiter 128 associated with the memory interface 84. The transaction request transmitted on the processor request bus 106 also includes a destination tag identifying the processor 52, an address identifying the portion of the system memory 58 to be read, a byte enable value indicating bytes to be read, a count value indicating the number of requested data transfers, and a status value indicating whether a read or a write is being requested. The request arbiter 128 causes the request selector 100 to connect the processor request bus 106 to the memory interface 84 to enable the memory interface to except the transaction request. If the memory interface 84 is ready to receive the transaction request, then the memory interface latches the transaction request and deasserts a request busy signal on the memory request busy line 114. If the memory interface 84 were too busy to latch the transaction request, then the memory interface 84 would have left the request busy signal asserted on the memory request busy line 114 to indicate to the processor interface 84 that the transaction request will have to be resubmitted.

Concurrently with the transmission of the transaction request signals, the processor interface 82 deasserts a read busy signal on the processor data/control bus 146 to indicate that the processor interface 82 is ready to receive the data being requested by the read transaction. The memory interface 84 reads the requested portions of the system memory 58 and returns the data on the memory response signal bus 160 to the processor interface 82 via the memory response selector 154. The memory interface 84 also transmits on the memory response signal bus 160, the response tag indicating that the data being transmitted was requested by the processor 56. It will be appreciated that the destination and response tags are not strictly necessary with respect to transactions between the processor interface 82 and the memory interface 84 because all transactions controlled by the processor interface 82 are transmitted from the processor 52. However, such destination and response tags are more useful when a transaction is between devices on the first and second PCI buses 60, 72 so that the data being read can be returned to the correct requesting device.

In the write transaction illustrated by the timing diagram shown in FIG. 6, the processor interface 82 transmits the transaction request on the processor request line 106 to the memory interface 84 via the request selector 100 and request arbiter 128. The write transaction request can be identical to the read transaction request shown in FIG. 5 except that the status value will indicate that the transaction request is a write transaction request rather than a read transaction request. As with the read transaction shown in FIG. 5, the memory interface 84 will deassert the request busy signal on the memory request busy line 114 if the memory interface 84 is ready to receive and latch the transaction request and will leave the request busy line asserted otherwise.

Concurrently with the transaction request transmitted on the processor request line 120 (FIG. 3), the processor interface 82 asserts a write strobe signal on the processor data/control bus 146 to initiate the data phase of the transaction. Also, the processor interface 82 re-transmits the destination tag so that the memory interface 84 can match the data being written with the appropriate transaction request. In addition, the processor interface 82 transmits four 64-bit data words as indicated by the count value of four transmitted in the write transaction request. As the fourth data word is being received, the memory interface 84 transmits a write complete signal indicating that the transaction is being completed. The memory interface 84 also transmits the appropriate response tag indicating that the transaction being completed is the one that was transmitted by the processor 56. After receiving the fourth data word, the memory interface 84 asserts a write busy signal to indicate that the memory interface is not ready to receive more data.

Figure 7:
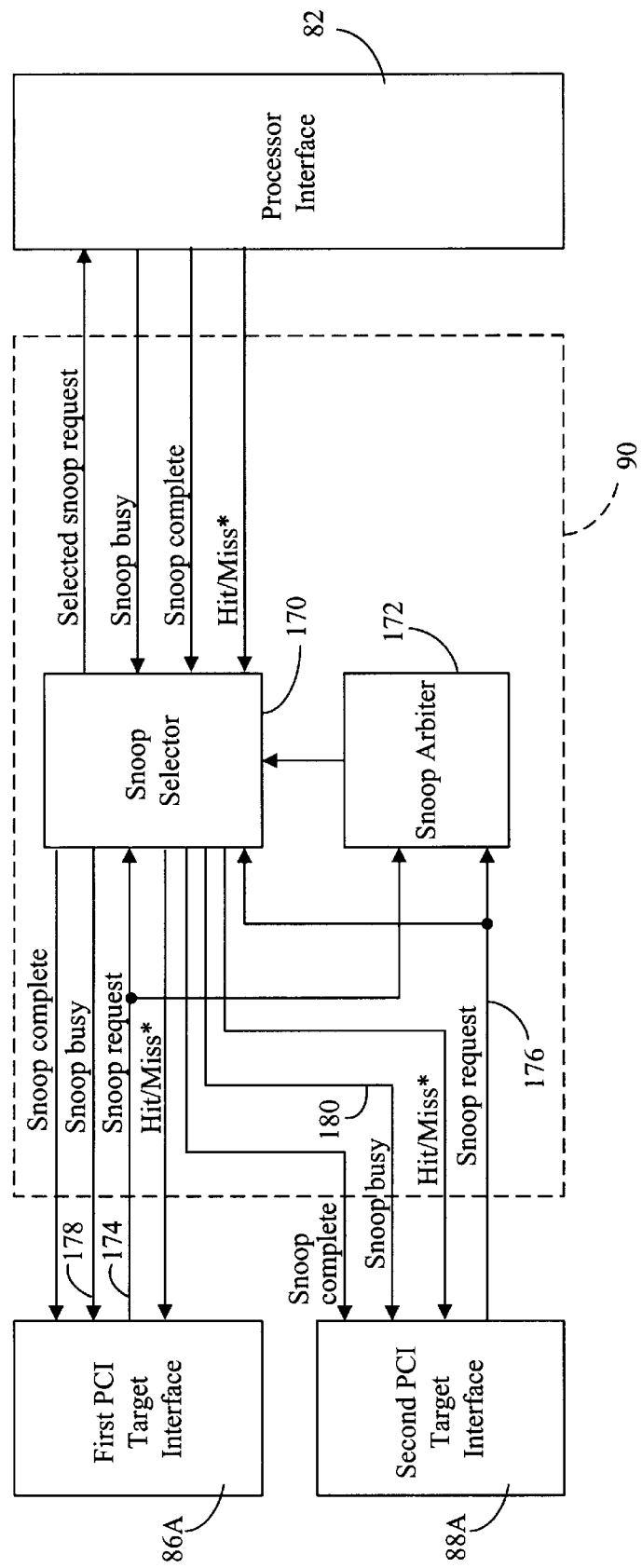
FIG. 7 is a block diagram of a snoop portion of the bridge of the computer system shown in FIG. 2.

A block diagram of a snoop phase portion of the system controller 56 that performs the snoop phase of each transaction is shown in FIG. 7. The control switch 90 enables the snoop phase to be implemented concurrently with the request and data phases. The control switch 90 includes a snoop selector 170 and a snoop arbiter 172 connected by first and second snoop request buses 174, 176 to the first and second PCI target interfaces 86A, 88A. respectively. In response to receiving snoop requests on the snoop request buses 174, 176, the snoop arbiter 172 selects one of the snoop requests and causes the snoop selector 170 to connect the selected snoop request line 174, 176 to the processor interface 82. The processor 52 normally responds to the snoop request in a pipeline queue of snoop requests. However, the queue can only contain a limited number of snoop requests. If the queue is full the processor interface 82 transmits the snoop busy signal to the snoop selector 170. In response to receiving the snoop busy signal, the snoop selector 170 prevents further snoop requests from being selected and forwards the snoop busy signal on a first PCI snoop busy line 178 or a second PCI snoop busy line 180 to whichever one of the PCI target interfaces 86A, 88A transmitted the selected snoop request. The PCI target interface that transmitted the snoop request thus monitors the incoming snoop busy line to determine if its snoop request has been accepted by the processor interface 82.

If the snoop request queue is not fill, the processor interface 82 captures the selected snoop request and the processor executes the snoop request to determine whether the cache memory 54 is storing data for the portion of the system memory 58 being requested in the transaction request corresponding to the selected snoop request. When the processor 52 has executed the snoop request, it transmits a snoop complete signal to the snoop selector 170. The snoop selector then couples the snoop complete line to the PCI Target Interface 86A or 86B that initiated the snoop request. The processor interface 82 also returns a hit/miss* signal along with the snoop complete signal to provide an indication whether the requested address in system memory 58 is coherent with the corresponding address in cache memory 54. The snoop selector 170 receives the hit/miss* signal and routes it to whichever one of the PCI Target Interfaces 86A, B that initiated the snoop request. If the cache memory 54 is not storing data for the portion of the system memory 58 being requested in the transaction request, then the process interface returns an active low miss* signal, and the transaction request proceeds as described in FIGS. 3 and 4. If the cache memory 54 is storing data related to the portion of system memory 58 being requested by the transaction request, then the processor interface 82 returns an active high hit signal that causes the data to be read from the cache memory 54 and written to the system memory 58 via the processor and memory interfaces 82, 84 of the system controller 56. In such a situation, the active high hit signal causes whichever one of the PCI target interfaces 86A, 88A transmitted the selected snoop request to reissue the memory request.

Based on the foregoing discussion it will be appreciated that the embodiments of the present invention described herein provide a highly efficient control switch that interconnects computer devices in a computer system. Unlike prior art computer systems that rely on a processor bus for access to the system memory, the control switch provides direct connections to the system memory for plural computer devices. In addition, the control switch maximizes the speed of transactions by concurrently executing the request and data phases of the transactions.

As discussed above, the computer system 50 enables generic computer transactions between computer devices to be implemented efficiently. In addition, the computer system 50 can be employed to execute memory transactions more efficiently by eliminating delays associated with snooping the cache memory 54. Such snoop delays can be eliminated by concurrently executing snoop and memory phases of a memory transaction.

As discussed above, snooping refers to determining whether the cache memory 54 currently stores information in an address corresponding to a selected address of the system memory 58 being accessed by a memory transaction. Such snooping insures cache coherency between the cache memory 54 and system memory 58 before each read transaction is performed and after each write transaction is performed. Such snooping is done before read transactions to insure that the data being read is the most recently updated read data for the address being requested in the read transaction. Such snooping is needed in computer systems that do not insure cache coherency with each write transaction such that the cache memory 54 can store data for an address that has not been updated in the system memory. Such snooping is performed for write transactions received from one of the PCI buses 60, 72 to insure cache coherency between the cache memory 54 and system memory 58 after the write transaction is completed.

Figure 8:
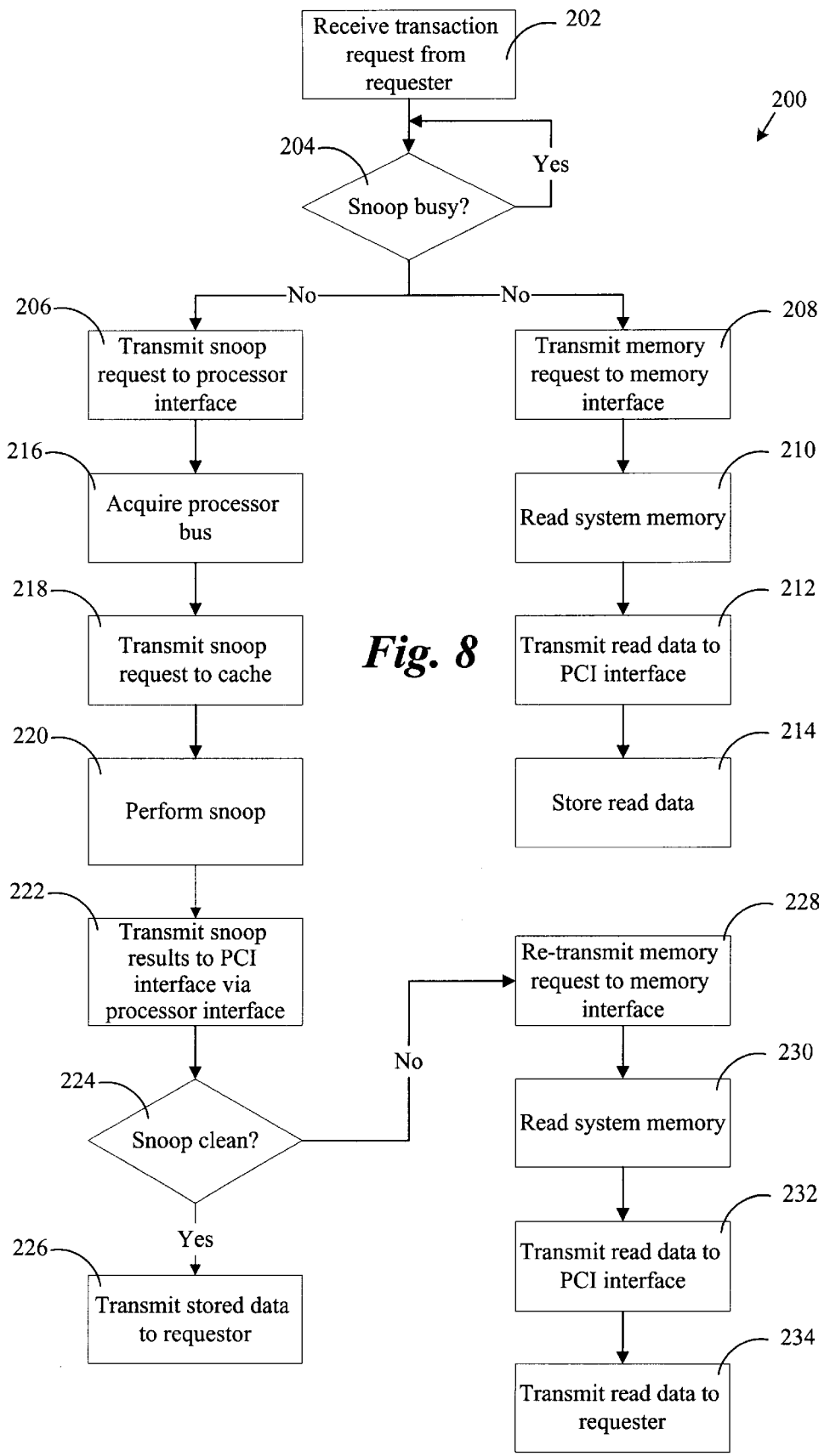
FIG. 8 is a flow diagram of a method of concurrently performing memory and snoop phases of a memory transaction according to the present invention.

A method 200 of processing memory transactions according to an embodiment of the present invention is shown in FIG. 8. In step 202 a transaction request for access to a selected address of the system memory 58 is received from a memory requester at one of the target interfaces 86A, 88A (FIG. 2). The memory requester can be any one of the devices 60–80 shown in FIG. 2, but, for simplicity, the following discussion will focus, on the graphics controller 74 being the memory requester. In addition, although the invention is applicable with both read and write transaction requests, the following discussion focuses on read transaction requests.

In response to receiving the read transaction request from the graphics controller 74 via the second PCI bus 72, the second PCI target interface 88A determines whether the processor interface 82 has issued a snoop busy signal on the second PCI snoop busy line 180. As discussed above, the processor interface 82 will issue the snoop busy signal if the snoop request queue is full and thus not ready to process a new snoop request. In response to determining that the snoop busy signal has been asserted, the second PCI target interface 88A delays issuing a snoop request to the processor interface 82 and a memory request to the memory interface 84 until the processor interface 82 terminates the snoop busy signal.

In response to determining in step 204 that the snoop busy signal is not active, the second PCI target interface 88A concurrently transmits a snoop request to the processor interface 82 in step 206 and a memory request to the memory interface 84 in step 208. This contrasts with prior art memory transaction processing methods in which the memory request is not transmitted until after receiving a response to the snoop request from the cache memory 54. The transmission of the snoop request in step 206 begins a snoop phase of the memory transaction while the transmission of the memory request in step 208 begins a memory access phase of the memory transaction.

In response to receiving the memory request from the second PCI target interface 88A, the memory interface 84 reads the selected address of the system memory 58 in step 210. In step 212 the memory interface 84 transmits the data read from the selected address to the second PCI target interface 88A. In step 214 the second PCI target interface 88A stores within the second PCI target interface the data read from the selected address while the snoop phase is being executed.

In response to receiving the snoop request transmitted in step 206, the processor interface 82 executes the snoop request by acquiring the processor bus 57 in step 216. The processor bus 57 is acquired in a known manner by arbitrating with the processor 52 for access to the processor bus 57. Upon acquiring the processor bus in step 216. the processor interface 82 transmits the snoop request on the processor bus 57 to the cache memory 54 in step 218. In step 220, the cache memory 54 performs the snoop requested by the snoop request by determining whether the cache memory 54 currently stores information at an address corresponding to the selected address of the system memory 58. Specifically, the cache memory 54 determines whether the cache memory stores a cache line that includes the selected address of the transaction request. As is well-known, the cache memory 54 includes a directory of cache lines currently stored in the cache memory such that the snoop is performed by checking the directory to determine whether the cache memory stores a cache line that includes the selected address.

In step 222 the processor interface transmits a snoop complete signal and a hit/miss* signal indicative of the results of the snoop performed in step 220 to the second PCI target interface 88A via the processor interface 82. The snoop results will include an active high hit signal indicative of a snoop dirty (i.e., cache hit) if the cache memory 54 currently stores a cache line that includes the selected address. Conversely, the snoop results will include an active low miss* signal indicative of a snoop clean (i.e., cache miss) if the cache memory 54 currently does not store a cache line that includes the selected address. In step 224 the second PCI target interface 88A determines whether the snoop results received from the cache memory 54 include a snoop clean indication. If so, then in Step 2–6 the second PCI Target interface 88A transmits to the memory requester (e.g., graphics controller 74) the data read from the system memory in step 210 and stored in the second PCI target interface 88A in step 214.

If the snoop performed in step 220 determines that the cache memory 54 stores a cache line that includes the selected address, then the cache memory 54 writes the cache line to the system memory 58. Writing the cache line to the system memory 58 ensures cache coherency, that is, that the system memory 58 stores the same information for the cache line as the cache memory 54. As a result, a subsequent read request for the selected address of the system memory 58 will be guaranteed to produce the most recently updated information for the selected address.

If the second PCI target interface 88A determines in step 224 that the snoop results include a snoop dirty indication, then in step 228 the second PCI target interface 88A retransmits to the memory interface 84 the memory request to read the selected address of the system memory 58. In step 230 the memory interface 84 reads the selected address of the system memory 58 and transmits the read data to the second PCI target interface 88A in step 232. Given that the cache memory 54 has already, been snooped, the second PCI target interface 88A can safely transmit the read data to the memory requester in step 234 without waiting for another snoop to occur.

It should be appreciated that the method 200 shown in FIG. 8 can be implemented using the system controller 56 with the control switch 90 as shown in FIG. 2 or using a system controller with an internal bus interconnecting the interfaces 82–88. However, the system controller 56 with the control switch 90 allows a more efficient implementation than would a system controller with an internal bus. The use by the control switch 90 of separate pathways for the request, data, and snoop phases of a memory transaction enable the PCI target interfaces 86A, 88A to simultaneously transmit the snoop request to the processor interface 82 in step 206 and the memory request through the memory interface 84 in step 208 of FIG. 8.

Figure 9:
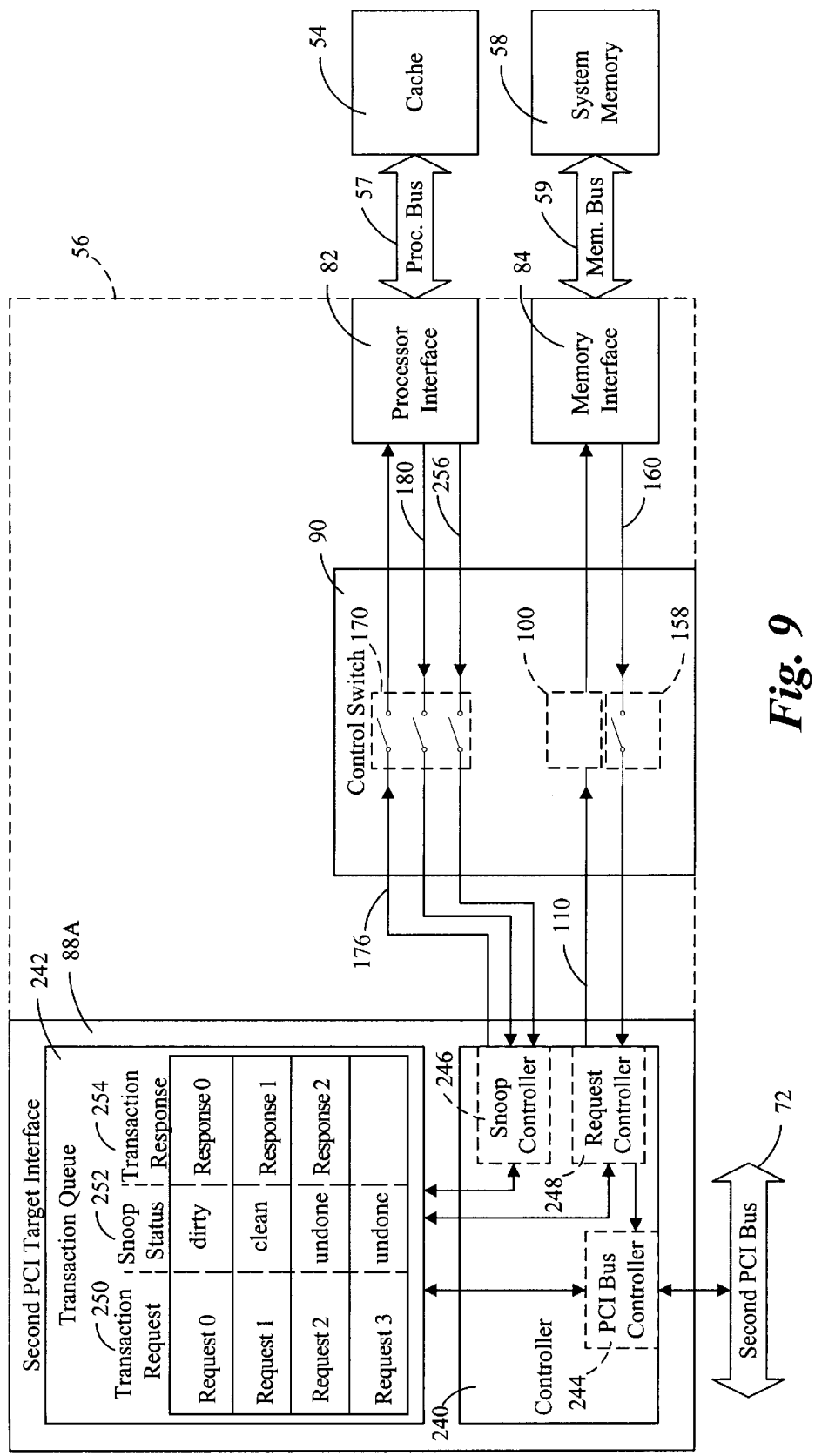
FIG. 9 is a block diagram of a computer system for concurrently performing memory and snoop phases of a memory transaction according to the present invention.

A more detailed block diagram of the system controller 56 as employed to implement the method 200 is shown in FIG. 9. The second PCI target interface 88A includes a controller 240 and a storage device storing a transaction queue 242. The controller 240 provides an interface between the second PCI bus 72 and the control switch 90. The controller 240 includes a PCI bus controller 244 coupled to the second PCI bus 72, a snoop controller 246 coupled to the snoop selector 170 of the control switch 90, and a request controller 248 coupled to the memory request selector 100 and the second PCI target response selector 158 of the control switch 90.

The controller 240 also receives transaction requests from the second PCI bus 72 and uses the transaction queue 242 to keep track of the execution of the transaction requests. The transaction queue 242 includes at least three fields: a transaction request field 250 that stores each transaction request received by the second PCI target interface 88A, a snoop status field 252 that identifies the snoop status of each transaction, and a transaction response field 254 that stores each transaction response. The snoop status field 252 can include a dirty indication (the snoop request resulted in a cache hit or snoop dirty response), a clean indication (the snoop request resulted in a cache miss or snoop clean response), or an undone indication (a response to the snoop request has not been received).

In response to receiving a transaction request, such as transaction request 0, from the second PCI bus 72, the PCI bus controller 244 enters an identification of the transaction request in the transaction request field 250 and sets the corresponding snoop status field 252 to indicate that a snoop request has not been completed for the transaction request being entered in the transaction queue 242. The snoop controller 246 monitors the transaction queue 242 and, in response to noticing that a new transaction request has been entered in the transaction request field 250, determines whether the processor interface 82 has activated the snoop busy signal on the snoop busy line 180. If the snoop busy signal has not been activated, then the snoop controller 246 transmits a snoop request for the transaction on the second snoop request line 176 to the processor interface 82 via the snoop selector 170 of the control switch 90.

Concurrently with the transmission of the snoop request by the snoop controller 246, the request controller 248 transmits a memory request for the transaction on the second PCI request line 110 to the memory interface 84 via the memory request selector 100 of the control switch 90. The memory interface 84 executes the memory request by reading data from (or writing data to) the selected address of the system memory 58 and returning the read data on the memory response signal bus 160 to the request controller 248 via the second PCI target response selector 158 of the control switch 90. In response, the request controller 248 will update the transaction response field 254 of the transaction queue 242 to store the data read from the selected address or a pointer to where the read data is stored within the second PCI target interface 88A.

While the memory interface 84 is executing the memory request, the processor interface 82 attempts to acquire the processor bus 57 in order to transmit the snoop request to the cache memory 54. After the processor interface 82 acquires the processor bus 57 and transmits the snoop request to the cache memory 54, the cache memory 54 will perform the snoop requested and return the snoop results to the processor interface 82 via the processor bus 57. The processor interface 82 will forward the snoop results to the snoop controller 246 via the snoop selector 170 and a snoop response line 256. In response, the snoop controller 246 will update the snoop status field 252 in the transaction queue 242 to indicate whether the snoop results received by the snoop controller included a dirty indication or a clean indication. If the snoop results include a clean indication, then the PCI bus controller 244 will capture the read data stored in the transaction response field 254 and transmit the read data on the second PCI bus 72 to the device that issued the transaction request.

If the snoop results stored in the snoop status field 252 include a dirty indication, then the request controller 248 will re-transmit the memory request to the memory interface 84 via the second PCI request line 10 and the memory request selector 100. The memory interface 84 will read the selected address which has been updated by the cache memory 54 in response to determining that the corresponding snoop request resulted in the snoop dirty signal being sent. The memory interface 84 will return the updated data read from the selected address of the system memory 58 to the request controller 248 via the memory response signal bus 160 and the second PCI target response selector 158. The request controller 248 transmits the updated read data to the PCI bus controller 244 which forwards the updated read data on the second PCI bus 72 to the memory requester that initiated the transaction request.

The transaction queue 242 enables multiple snoop requests to be queued and transmitted to the processor interface 82 in a pipelined manner. As a result, the processor interface 82 can issue the snoop requests to the cache memory 54 in the fastest possible manner that the processor bus 57 allows. This contrasts with prior art computer systems which wasted valuable system throughput by re-acquiring the processor bus 57 before each snoop request rather than issuing snoop requests in a back-to-back fashion. Upon acquiring the processor bus 57 before a first snoop request, the processor interface 82 can issue snoop requests every three processor clock cycles without releasing the processor bus 57. This contrasts with the fastest known snoop cycle for Pentium-based computer systems which is seven clock cycles. The faster the snoops are completed, the sooner that the processor bus 57 can be used to issue requests from the system processor 52.

To ensure that the processor interface 82 does not unreasonably monopolize the processor bus 57 with snoop requests, the processor interface 82 can monitor a bus request signal (BREQ) from the processor 52 to determine if the processor bus 57 is needed. If the BREQ signal is inactive, then the snoop requests can continue with no throughput impact. If the BREQ signal is active, then the processor bus 57 will be released by the processor interface 82 after a configurable number of clock cycles to allow the processor 52 to acquire the processor bus 57. By monitoring the BREQ signal, the processor interface 82 prevents the processor 52 from being starved during heavy snoop activity.

Based on the foregoing discussion it will be appreciated that the embodiments of the present invention described herein provide a highly efficient method of executing memory transactions in a computer system. The method transmits a memory request of a transaction to the system memory without waiting for a response to a corresponding snoop request of the transaction. As used herein, the term "snoop request" is intended broadly to include a request from any computer device to another computer device to determine whether a memory device stores information for any address corresponding to a selected address of another memory device being requested by a corresponding memory request. This allows memory transactions to be completed more quickly than do prior art methods that require the snoop phase of a transaction to be completed before a memory request can be sent to the system memory. Moreover, the method enables snoop requests to be processed in a pipelined manner to execute the snoop phases of transactions more quickly which also reduces the ability of snoop requests to delay the execution of transaction requests issued by the system processor.

It should be understood that even though numerous advantages of the present invention have been set forth in the foregoing description, the above disclosure is illustrative only. Changes may be made in detail and yet remain within the broad principles of the present invention.

We claim:

1. A method of processing memory transactions in a computer system having a system memory, a cache memory and a processor bus that couples the cache memory to a system controller, the method comprising:

transmitting to the cache memory through the processor bus a snoop request that requests from the cache memory an indication of whether the cache memory currently stores information at an address corresponding to a selected address of the system memory, wherein transmitting the snoop request to the cache memory includes transmitting a plurality of snoop requests across the processor bus in a pipelined manner such that the plurality of snoop requests is transmitted on the processor bus without the system controller releasing control of the processor bus between snoop requests of the plurality of snoop requests; and transmitting to the system memory a plurality of memory requests for access to respective selected addresses of the system memory before the cache memory responds to all of the snoop requests.

2. The method of claim 1 wherein transmitting the snoop request to the cache memory and transmitting the memory request to the system memory are performed concurrently.

3. The method of claim 1 wherein transmitting a memory request includes transmitting a read memory request to read the selected address of the system memory.

4. The method of claim 1 wherein the computer system further includes a memory requester and a requester interface, the method further comprising:

transmitting from the cache memory to the requester interface the indication of whether the cache memory currently stores information at an address corresponding to the selected address of the system memory;

transmitting from the system memory to the requester interface a response to the memory request; and forwarding the response to the memory requester only if the indication from the cache memory indicates that the cache memory does not currently store information at an address corresponding to the selected address of the system memory.

5. The method of claim 1 wherein the computer system further includes a memory requester and a requester interface, the method further comprising:

transmitting from the cache memory to the requester interface the indication of whether the cache memory currently stores information at an address corresponding to the selected address of the system memory;

transmitting from the system memory to the requester interface a response to the memory request; and if the indication from the cache memory indicates that the cache memory currently stores information at an address corresponding to the selected address of the system memory, then copying the information from the cache memory to the selected address of the system memory and transmitting to the system memory another memory request for access to the selected address of the system memory.

6. The method of claim 1 wherein the system controller is further coupled to the and system memory, the system controller including a control switch selectively coupling a requesting bus interface to a processor interface and a memory interface, the step of transmitting the snoop request to the cache memory includes transmitting the snoop request from the requesting bus interface to the processor interface via the control switch, and the step of transmitting the memory request to the system memory includes transmitting the memory request from the requesting bus interface to the memory interface via the control switch.

7. A method of processing memory transactions in a computer system having a system memory, a cache memory, a processor interface coupled to the cache memory and a requester interface coupled to a memory requester, the method comprising:

determining if any snoop conflicts exist before transmitting a snoop request from the requester interface to the processor interface that requests from the cache memory an indication of whether the cache memory currently stores information at an address corresponding to a selected address of the system memory;

transmitting a snoop busy signal from the processor interface to the requester interface if it is determined that a snoop conflict exists;

delay transmitting the snoop request from the requester interface to the processor interface in response to receiving the snoop busy signal;

if the snoop busy signal is not received, transmitting to the cache memory the snoop request; and transmitting to the system memory a memory request for access to the selected address of the system memory before the cache memory produces the indication of whether the cache memory currently stores information at an address corresponding to the selected address of the system memory.

8. The method of claim 7 wherein transmitting the snoop request to the cache memory and transmitting the memory request to the system memory are performed concurrently.

9. The method of claim 7 wherein transmitting a memory request includes transmitting a read memory request to read the selected address of the system memory.

10. The method of claim 7 wherein the method further comprising:

transmitting from the cache memory to the requester interface the indication of whether the cache memory currently stores information at an address corresponding to the selected address of the system memory;

transmitting from the system memory to the requester interface a response to the memory request; and forwarding the response to the memory requester only if the indication from the cache memory indicates that the cache memory does not currently store information at an address corresponding to the selected address of the system memory.

11. The method of claim 7 wherein the method further comprising:

transmitting from the cache memory to the requester interface the indication of whether the cache memory currently stores information at an address corresponding to the selected address of the system memory;

transmitting from the system memory to the requester interface a response to the memory request; and if the indication from the cache memory indicates that the cache memory currently stores information at an address corresponding to the selected address of the system memory, then copying the information from the cache memory to the selected address of the system memory and transmitting to the system memory another memory request for access to the selected address of the system memory.

12. The method of claim 7 wherein the computer system further includes a system controller coupled to the cache memory and system memory, the system controller including a control switch selectively coupling a requesting bus interface to the processor interface and a memory interface, the step of transmitting the snoop request to the cache memory includes transmitting the snoop request from the requesting bus interface to the processor interface via the control switch, and the step of transmitting the memory request to the system memory includes transmitting the memory request from the requesting bus interface to the memory interface via the control switch.

13. A method of processing memory transactions in a computer system having a system memory, a cache memory, and a processor bus that couples the cache memory and a processor to a system controller, the method comprising:

transmitting to the cache memory through the processor bus a sequence of snoop requests, each of the snoop requests requesting from the cache memory an indication of whether the cache memory currently stores information at an address corresponding to a selected address of the system memory, transmitting to the system memory a memory request for access to the selected address of the system memory before the cache memory produces the indication of whether the cache memory currently stores information at an address corresponding to the selected address of the system memory;

determining that the processor requests access to the processor bus while the system controller is transmitting the sequence of snoop requests to the cache memory across the processor bus; and in response to determining that the process requests access to the processor bus, interrupting the transmission of the sequence of snoop requests to allow the processor to acquire control of the processor bus.

14. The method of claim 13 wherein transmitting the snoop request to the cache memory and transmitting the memory request to the system memory are performed concurrently.

15. The method of claim 13 wherein transmitting a memory request includes transmitting a read memory request to read the selected address of the system memory.

16. The method of claim 13 wherein the computer system further includes a memory requester and a requester interface, the method further comprising:

transmitting from the cache memory to the requester interface the indication of whether the cache memory currently stores information at an address corresponding to the selected address of the system memory;

transmitting from the system memory to the requester interface a response to the memory request; and forwarding the response to the memory requester only if the indication from the cache memory indicates that the cache memory does not currently store information at an address corresponding to the selected address of the system memory.

17. The method of claim 13 wherein the computer system further includes a memory requester and a requester interface, the method further comprising:

transmitting from the cache memory to the requester interface the indication of whether the cache memory currently stores information at an address corresponding to the selected address of the system memory;

transmitting from the system memory to the requester interface a response to the memory request; and if the indication from the cache memory indicates that the cache memory currently stores information at an address corresponding to the selected address of the system memory, then copying the information from the cache memory to the selected address of the system memory and transmitting to the system memory another memory request for access to the selected address of the system memory.

18. The method of claim 13 wherein the computer system includes the system controller coupled to the cache memory and system memory, the system controller including a control switch selectively coupling a requesting bus interface to a processor interface and a memory interface, the step of transmitting the snoop request to the cache memory includes transmitting the snoop request from the requesting bus interface to the processor interface via the control switch, and the step of transmitting the memory request to the system memory includes transmitting the memory request from the requesting bus interface to the memory interface via the control switch.

19. A method of processing memory transactions in a computer system having a system controller coupled between an expansion bus, a system memory, a cache memory, and a processor bus that couples the cache memory, the system controller including an expansion bus interface coupled to the expansion bus, a memory interface coupled to the system memory and a processor interface coupled to the processor bus, the method comprising:

receiving at the expansion bus interface from the expansion bus a transaction request for access to a selected address of the system memory;

transmitting from the expansion bus interface to the processor interface a plurality of snoop requests across the processor bus in a pipelined manner such that the plurality of snoop requests is transmitted on the processor bus without the processor interface releasing control of the processor bus between snoop requests of the plurality of snoop requests, each of the snoop requests requesting from the cache memory an indication of whether the cache memory currently stores information at an address corresponding to the selected address of the system memory; and transmitting from the expansion bus interface to the memory interface a plurality of memory requests for access to respective selected addresses of the system memory before the expansion bus receives responses to all of the snoop requests.

20. The method of claim 19 wherein transmitting the snoop request to the cache memory and transmitting the memory request to the system memory are performed concurrently.

21. The method of claim 19 wherein transmitting a memory request includes transmitting a read memory request to read the selected address of the system memory.

22. The method of claim 19 wherein the method further comprising:

transmitting from the processor interface to the expansion bus interface the indication of whether the cache memory currently stores information at an address corresponding to the selected address of the system memory;

transmitting from the memory interface to the expansion bus interface a response to the memory request; and forwarding the response to the expansion bus only if the indication received from the processor interface indicates that the cache memory does not currently store information at an address corresponding to the selected address of the system memory.

23. The method of claim 19 wherein the method further comprises:
   transmitting from the processor interface to the expansion bus interface the indication of whether the cache memory currently stores information at an address corresponding to the selected address of the system memory;
   transmitting from the memory interface to the expansion bus interface a response to the memory request; and
   if the indication received from the processor interface indicates that the cache memory currently stores information at an address corresponding to the selected address of the system memory, then copying the information from the cache memory to the selected address of the system memory and transmitting from the expansion bus interface to the memory interface another memory request for access to the selected address of the system memory.

24. The method of claim 19 wherein the system controller further includes a control switch selectively coupling the expansion bus interface to the processor interface and the memory interface, the step of transmitting the snoop request to the processor interface includes transmitting the snoop request from the expansion bus interface to the processor interface via the control switch, and the step of transmitting the memory request to the memory interface includes transmitting the memory request from the requesting bus interface to the memory interface via the control switch.

25. A method of processing memory transactions in a computer system having a system controller coupled between an expansion bus, a system memory, and a cache memory, the system controller including an expansion bus interface coupled to the expansion bus, a memory interface coupled to the system memory, and a processor interface coupled to the cache memory, the method comprising:
   receiving at the expansion bus interface from the expansion bus a transaction request for access to a selected address of the system memory;
   determining if any snoop conflicts exist before transmitting snoop requests from the expansion bus interface to the processor interface, each of the snoop requests requesting from the cache memory an indication of whether the cache memory currently stores information at an address corresponding to the selected address of the system memory;
   transmitting a snoop busy signal from the processor interface to the requester interface if the processor interface has received more than a predetermined number of unexecuted snoop requests;
   delaying transmission of the snoop request from the expansion bus interface to the processor interface in response to receiving the snoop busy signal;
   if the snoop busy signal is not received, transmitting to the cache memory the snoop request; and
   transmitting from the expansion bus interface to the memory interface a memory request for access to the selected address of the system memory before the expansion bus receives the indication of whether the cache memory currently stores information at an address corresponding to the selected address of the system memory.

26. The method of claim 25 wherein transmitting snoop the snoop request to the cache memory request to the system memory are performed concurrently.

27. The method of claim 27 wherein transmitting a memory request includes transmitting a read memory request to read the selected address of the system memory.

28. The method of claim 25 wherein the method further comprising:
   transmitting from the processor interface to the expansion bus interface the indication of whether the cache memory currently stores information at an address corresponding to the selected address of the system memory;
   transmitting from the memory interface to the expansion bus interface a response to the memory request; and
   forwarding the response to the expansion bus only if the indication received from the processor interface indicates that the cache memory does not currently store information at an address corresponding to the selected address of the system memory.

29. The method of claim 25 wherein the method further comprises:
   transmitting from the processor interface to the expansion bus interface the indication of whether the cache memory currently stores information at an address corresponding to the selected address of the system memory;
   transmitting from the memory interface to the expansion bus interface a response to the memory request; and
   if the indication received from the processor interface indicates that the cache memory currently stores information at an address corresponding to the selected address of the system memory, then copying the information from the cache memory to the selected address of the system memory and transmitting from the expansion bus interface to the memory interface another memory request for access to the selected address of the system memory.

30. The method of claim 25 wherein the system controller further includes a control switch selectively coupling the expansion bus interface to the processor interface and the memory interface, the step of transmitting the snoop request to the processor interface includes transmitting the snoop request from the expansion bus interface to the processor interface via the control switch, and the step of transmitting the memory request to the memory interface includes transmitting the memory request from the requesting bus interface to the memory interface via the control switch.

31. A method of processing memory transactions in a computer system having a system controller coupled between an expansion bus, a system memory, and a cache memory, the system controller including an expansion bus interface coupled to the expansion bus, a memory interface coupled to the system memory, and a processor interface coupled to the cache memory, the computer system further including a processor bus that couples the cache memory and a processor to the processor interface, and transmitting the snoop request includes transmitting a sequence of snoop requests, the method comprising:
   receiving at the expansion bus interface from the expansion bus a transaction request for access to a selected address of the system memory;
   transmitting from the expansion bus interface to the processor interface a sequence of snoop requests each of which requests from the cache memory an indication of whether the cache memory currently stores information at an address corresponding to the selected address of the system memory;
   transmitting from the expansion bus interface to the memory interface a memory request for access to the selected address of the system memory before the expansion bus receives the indication of whether the cache memory currently stores information at an address corresponding to the selected address of the system memory;

determining that the processor requests access to the processor bus while the system controller is transmitting the sequence of snoop requests to the cache memory across the processor bus; and in response to determining that the processor requests access to the processor bus, interrupting the transmission of the sequence of snoop requests to allow the processor to acquire control of the processor bus.

32. The method of claim 31 wherein transmitting the snoop request to the cache memory and transmitting the memory request to the system memory are performed concurrently.

33. The method of claim 31 wherein transmitting a memory request includes transmitting a read memory request to read the selected address of the system memory.

34. The method of claim 31 wherein the method further comprising:

transmitting from the processor interface to the expansion bus interface the indication of whether the cache memory currently stores information at an address corresponding to the selected address of the system memory;

transmitting from the memory interface to the expansion bus interface a response to the memory request; and forwarding the response to the expansion bus only if the indication received from the processor interface indicates that the cache memory does not currently store information at an address corresponding to the selected address of the system memory.

35. The method of claim 25 wherein the method further comprises:

transmitting from the processor interface to the expansion bus interface the indication of whether the cache memory currently stores information at an address corresponding to the selected address of the system memory;

transmitting from the memory interface to the expansion bus interface a response to the memory request; and if the indication received from the processor interface indicates that the cache memory currently stores information at an address corresponding to the selected address of the system memory, then copying the information from the cache memory to the selected address of the system memory and transmitting from the expansion bus interface to the memory interface another memory request for access to the selected address of the system memory.

36. The method of claim 31 wherein the system controller further includes a control switch selectively coupling the expansion bus interface to the processor interface and the memory interface, the step of transmitting the snoop request to the processor interface includes transmitting the snoop request from the expansion bus interface to the processor interface via the control switch, and the step of transmitting the memory request to the memory interface includes transmitting the memory request from the requesting bus interface to the memory interface via the control switch.

37. A method of processing memory requests in a computer system having a system memory and a cache memory, the computer system being capable of simultaneously processing a maximum number of snoop requests, the method comprising:

transmitting to the system memory a plurality of memory requests for access to respective selected addresses of the system memory, at least one of the memory requests being transmitted before a response to a prior memory request has been processed;

transmitting to the cache memory a plurality of snoop requests each of which requests an indication of whether the cache memory currently stores information at an address corresponding to a selected address of the system memory, at least one of the snoop requests being transmitted before responses to all of the memory requests have been received;

maintaining a record of all memory requests for which responses have not been processed, the record including for each memory request a record of the snoop status corresponding to each memory request and any received response to the memory request;

after the snoop status indicates that a response to the snoop request has been received and a response to the memory request has been received, processing the response to the memory request; and suspending the processing of additional memory requests until an additional snoop request has been processed.

38. The method of claim 31, wherein the processing of the response to each memory request comprises:

if the snoop status indicates the cache memory does not currently store information at the address corresponding to the selected address of the system memory, coupling the response to the memory request to an interface; and if the snoop status indicates the cache memory currently stores information at the address corresponding to the selected address of the system memory:

updating data stored at the selected address of the system memory to correspond to the data stored in the cache memory at the address corresponding to the selected address of the system memory, and re-transmitting the memory request to the system memory.

\* \* \* \* \*

UNITED STATES PATENT AND TRADEMARK OFFICE
CERTIFICATE OF CORRECTION

PATENT NO. : 5,991,855
DATED : November 23, 1999
INVENTOR(S) : Jeddeloh, et. al.

It is certified that error appears in the above-identified patent and that said Letters Patent is hereby corrected as shown below:

| | | |
|---|---|---|
| Column 4, line 27 | "buses 60, 7" | -- buses 60, 72 -- |
| Column 5, line 45 | "the memos" | -- the memory -- |
| Column 7, line 30 | "data.control" | -- data/control -- |
| Column 7, line 37 | "wit+h" | -- with -- |
| Column 12, line 20 | "in Step 2-6" | -- in step 226 -- |
| Column 12, line 21 | "Target" | -- target -- |
| Column 14, line 4 | "line 10" | -- line 110 -- |

Signed and Sealed this

First Day of May, 2001

Attest:

NICHOLAS P. GODICI

Attesting Officer

Acting Director of the United States Patent and Trademark Office